Patented July 22, 1952

2,604,486

UNITED STATES PATENT OFFICE 2,604,486

ORGANO POLYSILOXANE OILS

Charles A. Burkhard, Alplaus, N. Y., assignor to General Electric Company, a corporation of New York No Drawing. Application August 18, 1949, Serial No. 111,096

5 Claims. (Cl. 260—448.2)

The present invention relates to improvements in liquid organo-substituted polysiloxane oils employed, for example, for lubricating purposes. More particularly the invention relates to an improved organo-polysiloxane oil particularly characterized by the presence of silicon-bonded —$(CH_2)_nSCH_2COOR$ radicals where $n$ is an integer from 2 to 3 and R is hydrogen or a lower alkyl radical, e. g., a methyl, ethyl or propyl radical.

Liquid organo-substituted polysiloxanes, for example, liquid hydrocarbon-substituted polysiloxanes, because of their outstanding resistance to heat and to oxidation at elevated temperatures, because of their low viscosity-temperature coefficients, and because of their low pour-points, are ideal fluids for lubrication under hydrodynamic or fluid film conditions. However, such materials have a marked tendency to creep or spread over a metal surface and hence when employed, for example, as a bearing lubricant tend to flow out of the bearing, i. e., from between the bearing and shaft.

The primary object of this invention is to provide a liquid polysiloxane oil which does not spread or creep as easily or rapidly as the known polysiloxane oils and which is also characterized by little change of viscosity with temperature and a low pour-point. Other objects and advantages of the present invention will become apparent from the following description.

The liquid organo-substituted polysiloxanes with which this invention is concerned are compositions comprising essentially silicon atoms connected to one another by oxygen atoms as illustrated by the following siloxane structure:

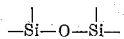

wherein a preponderant number of the valences of the silicon atoms are satisfied by the substitution thereon of organic radicals, of which from about 1 to 20 percent are —$(CH_2)_nSCH_2COOR$ radicals. These compositions of matter may be prepared, for example, by cohydrolysis of a mixture of hydrolyzable organo-substituted silanes, including silanes of the formula $R'R''SiX_2$ in which R' represents a saturated monovalent organic radical and R'' represents a vinyl or allyl radical followed by complete or partial condensation of the silicols to give siloxanes and the reaction of the resulting product with thioglycolic acid or an ester thereof.

The term "hydrolyzable organo-substituted silanes" is intended to include derivatives of $SiH_4$ which contain hydrolyzable groups or radicals, for example, hydrogen, halogens, amino groups, alkoxy, aryloxy, and acyloxy radicals, etc., in addition to the specified organic groups substituted directly on the silicon atom and joined to the silicon through carbon-silicon linkages. Examples of such organic radicals other than the vinyl or allyl radicals are aliphatic radicals including alkyl radicals, for example, methyl, ethyl, propyl, isopropyl, butyl, etc.; alicyclic radicals, for example, cyclopentyl, cyclohexyl, etc.; aryl radicals, for example, phenyl, diphenyl, naphthyl, anthracyl, etc., aralkyl radicals, for example, benzyl, phenylethyl, etc., alkaryl radicals, for example, tolyl, xylyl, etc., as well as hydroylzable silanes containing two different organic radicals, for example, methyl and phenyl radicals, etc., attached to the silicon atom. If desired, the above-mentioned radicals may also contain substituents substituted thereon, for instance, halogens.

Hydrolysis of the above silanes or mixtures of silanes results in the formation of silanols, i. e., organo-substituted silanes containing hydroxy groups substituted directly on the silicon, which hydroxy groups condense intermolecularly (intercondense) splitting out water to give the siloxane linkages mentioned previously. The liquid organopolysiloxanes prepared in this manner consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals such as the hydrolyzable radicals listed previously. More specifically, the oils of the present invention are composed of mixtures of cyclic or straight chain polysiloxane compounds of the type hereinbefore described containing from approximately 1.95 to 2.3 monovalent organic radicals per silicon atom, from 1 to 20 percent of such monovalent radicals being —$(CH_2)_nSCH_2COOR$ radicals. Preferably all or substantially all of the remaining silicon-bonded monovalent radicals are methyl radicals.

In order that those skilled in the art better may understand how the present invention may be carried into effect, the following illustrative example is given:

A mixture of dimethyldichlorosilane and methylallyldichlorosilane in the mol ratio of 9 to 1 was hydrolyzed in an ice-water-ether mixture. The oil-ether layer was separated and washed until free of acid. The ether was removed by heating on a steam-bath. The resulting oil was a clear thin liquid. The oil was shaken for 3 hours with an excess of 78% thioglycolic acid after which time it was allowed to stand overnight. The excess thioglycolic acid was removed by washing with water and filtering. A clear oil was obtained. The viscosity of this oil was found to be 47.2 centistokes at 100° F., and 14.8 cs. at 210° F. Its viscosity-temperature coefficient was 0.69. Analytical data obtained on the oil are as follows:

Sulfur (Parr Bomb) 1.15, 1.15%
Neutral equivalent, 5200 gm./eq.

As the iodine titration of the oil showed that substantially all of the sulfur was present as thio ether sulfur as the result of the reaction between the allyl groups and the thioglycolic acid. From the sulfur analysis, it can be calculated that 1.4% of silicon-bonded radicals were $-(CH_2)_3SCH_2CO_2H$ radicals.

A series of spreading tests were conducted on 1¼" square brass and steel surfaces utilizing various silicone oils. The surfaces were polished with Nos. 000 and 0000 metallographic polishing paper. A drop of the oil was placed on these surfaces and they in turn were placed in a glass encased stand. The diameter of the drops were measured at various time intervals.

Usually the silicone oils, especially the linear methyl polysiloxane oils, cover these squares within 24 hours. The sample of thio acid oil exhibited the following characteristics:

| Surface | Initial | Diameter of Drop 45 Days |
|---|---|---|
| | inch | inch |
| Brass | 3/32 | ¼ x 5/12 |
| Steel | 3/32 | ⅜ x ½ |

From the results of this test, it has been found that the oils of the present invention have a much lower creep or spread rate than of the presently known polysiloxane oils. As this property results from the presence in the oil molecules of the silicon-bonded $-(CH_2)_nSCH_2COOR$ radicals, it is obvious that the invention is not limited to the oils prepared as described in the above example. Other oils within the scope of the invention can be prepared, for example, by cohydrolysis of trimethylchlorosilane, dimethylchlorosilane and methyl vinyl dichlorosilane or methyl allyl dichlorosilane followed by reaction of the hydrolysis and condensation products with thioglycolic acid or ethyl thioglycolate to form oils comprising linear methylpolysiloxanes of the type described in Patnode Patent 2,469,888 but differing therefrom in that from 1 to 20 percent of the silicon-bonded organic radicals are $-(CH_2)_nSCH_2COOR$ radicals.

Likewise, oils of improved creep resistance can be obtained by mixing and, if desired, equilibrating the known organo-polysiloxane oils with the compounds or oils of the present invention in proportions such that there is obtained an oil consisting of a mixture of organo-polysiloxanes in which the $R''/R'+R''$ ratio is within the prescribed range.

Regardless of the process employed, the starting materials are so selected and employed in such proportions, that the final product will contain both $-R'_2SiO-$ and $-R'R''SiO-$ groups and the $R'+R''/Si$ ratio will be from 1.95 to 2.3 and the $R''/R'+R''$ ratio from 0.01 to 0.2.

What I claim as new and desire to secure by Letters Patent of the United States is:

1. Liquid organo-substituted polysiloxanes containing from 1.95 to 2.3 silicon-bonded organic radicals per silicon atom, said organic radicals being bonded to silicon atoms through silicon-carbon linkages, from 1 to 20 percent of said radicals being $-(CH_2)_nSCH_2COOR$ radicals wherein $n$ is an integer from 2 to 3 and R is selected from the group consisting of hydrogen and lower alkyl radicals, the remaining silicon-bonded organic radicals being saturated monovalent hydrocarbon radicals.

2. Liquid organo-substituted polysiloxanes containing from 1.95 to 2.3 silicon-bonded organic radicals per silicon atom, the remaining silicon valences being satisfied by oxygen atoms from 1 to 20 percent of said organic radicals being $-(CH_2)_nSCH_2COOR$ radicals wherein $n$ is an integer from 2 to 3 and R is selected from the group consisting of hydrogen and lower alkyl radicals, the remaining silicon-bonded radicals being methyl radicals.

3. Liquid organo-substituted polysiloxanes consisting essentially of $-R'_2SiO-$ and $-R'R''SiO-$ groups in which R' represents a saturated monovalent hydrocarbon radical and R'' represents $-(CH_2)_nSCH_2COOR$ radical in which $n$ is a number from 2 to 3 and R is selected from the group consisting of hydrogen and the lower alkyl radicals, said groups being present in proportions such that the R'' groups are from 1 to 20 percent of the total R' and R'' groups.

4. Liquid organo-substituted polysiloxanes of claim 3 in which R represents hydrogen.

5. Liquid organo-substituted polysiloxanes consisting substantially of $-(CH_3)_2SiO-$ and $-(CH_3)[-(CH_2)_3SCH_2COOH]SiO-$ units in proportions such that the ratio of $-(CH_2)_3SCH_2COOH$ radicals to the total silicon-bonded radicals is between 0.01 and 0.2.

CHARLES A. BURKHARD.

REFERENCES CITED

The following references are of record in the file of this patent:

UNITED STATES PATENTS

| Number | Name | Date |
|---|---|---|
| 2,515,857 | Burke | July 18, 1950 |

OTHER REFERENCES

Larsson: Svensk Kem. Tid., vol. 60 (1948), pp. 178-80.